United States Patent [19]

Proctor

[11] Patent Number: 4,463,411
[45] Date of Patent: Jul. 31, 1984

[54] SUPPLEMENTARY UPPER BRAKE LIGHT

[76] Inventor: Ronald A. Proctor, Woodham La., Sedbury, Woking, England

[21] Appl. No.: 292,927

[22] Filed: Aug. 14, 1981

[30] Foreign Application Priority Data

Jan. 6, 1981 [DE] Fed. Rep. of Germany ... 8100244[U]

[51] Int. Cl.³ ............................................... B60Q 1/00
[52] U.S. Cl. ........................................ 362/61; 362/80; 362/368; 362/382
[58] Field of Search ................... 362/61, 80, 190, 382, 362/397, 398, 389, 368

[56] References Cited

U.S. PATENT DOCUMENTS 1,739,641 12/1929 Lessmann .............................. 362/397
3,700,879 10/1972 Franc ................................... 362/389

Primary Examiner—Donald P. Walsh
Attorney, Agent, or Firm—Berman, Aisenberg & Platt

[57] ABSTRACT

A supplementary upper brake light for use in road vehicles comprising a brake light casing which is provided with at least one adhesive pad or strip for attachment of the brake light to the inside surface of a vehicle rear window.

1 Claim, 3 Drawing Figures

SUPPLEMENTARY UPPER BRAKE LIGHT

This invention relates to supplementary upper brake lights for road vehicles, especially saloon cars and other road vehicles with inclined rear windows.

It is already known to supplement the rear brake lights on road vehicles by mounting a pair of supplementary upper brake lights on posts or other supports which are fixed to the bodywork of a vehicle adjacent the inner surface of its rear window. Research carried out by motoring organizations and road users indicates that the provision of such supplementary upper brake lights on vehicles reduces the likelihood of road accidents because such lights can be seen through the front and rear windows of a number of cars in a queue.

The known supplementary upper brake lights, however, have certain disadvantages. In particular, the light of the bulb in each brake light is not shielded from the driver and occupants of the vehicle in which the supplementary upper brake lights are fitted, so that the driver can easily be distracted by the said brake lights when they come on. In addition, the mounting of the brake lights on posts or other such supports increases their cost undesirably and does not enhance their appearance.

The aim of the present invention is to overcome these disadvantages.

To this end, a supplementary upper brake light for use in road vehicles is characterised by the provision of a casing having at least one adhesive pad or strip for attachment of the brake light to the inside surface of a vehicle rear window.

Other preferred features of the invention are set forth in claims 2-4 herein.

An example of a supplementary upper brake light in accordance with the invention is shown in the accompanying drawing, in which.

Figure 1:
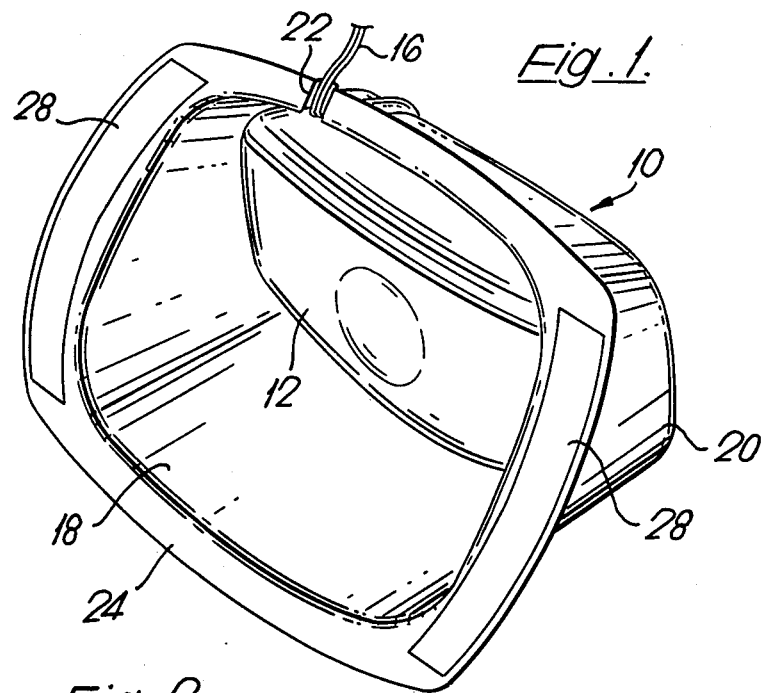
FIG. 1 is a perspective view from above of the brake light.
Figure 3:
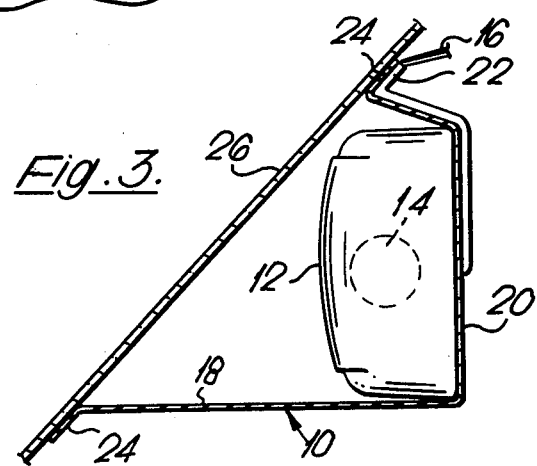
FIG. 3 is an enlarged section taken on the line III—III in FIG. 2.

The supplementary upper brake light shown in FIGS. 1 and 3 comprises a casing 10 preferably moulded out of a synthetic plastics material. Within a recess formed by the casing is a red lens 12 containing an electric light bulb 14 supplied with current through twin-flex 16. The inside surface 18 of the casing is silver-coloured, while its outside surface 20 is black. A small groove 22 is provided in a peripheral planar flange 24 of the casing to accommodate the flex 16.

Figure 2:
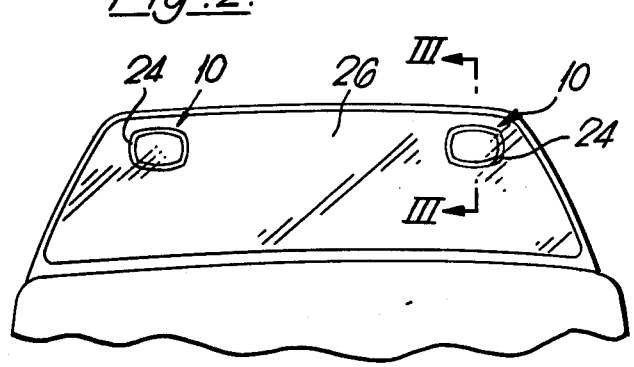
FIG. 2 is a reduced-scale view of two such brake lights attached to the rear window of a car.

Two such brake lights are shown in FIG. 2 with their casings 10 attached to the inner surface of a vehicle rear window 26. Attachment of each brake light to the window is effected by two adhesive pads or strips 28 carried on the planar flange 24, the pads or strips being protected prior to use by paper coverings (not shown) which can be peeled off.

The casing 10 is so shaped that the light from the bulb 14 is projected rearwardly and horizontally as shown in FIG. 3, while the peripheral flange 24 lies at an inclination to the horizontal corresponding to the inclination of the vehicle rear window 26. The casing 10 is light-impermeable and surrounds the bulb 14 and its lens 12 to a substantial extent so as to shield its light from the passenger compartment of the vehicle.

I claim:

1. A supplementary upper brake light for attachment to the inner surface of the rear window of a road vehicle, said brake light comprising:
   (a) a one-piece moulded casing of light-impermeable synthetic plastic material having a silver-colored inside surface and being of generally triangular shape when seen in side view, said casing comprising a bottom wall and a rear wall lying substantially at right angles to each other with said bottom wall and said rear wall being closed at their ends by two opposing side walls of substantially triangular or truncated triangular shape;
   (b) at least one electric light bulb and a mounting therefor supported within the casing in the region of said rear wall;
   (c) a red-colored lens surrounding said electric light bulb and mounted against said rear wall of the casing while lying entirely within the casing; and
   (d) a substantially flat flange formed peripherally on said casing to lie against the rear window of a road vehicle and extending substantially around the entire periphery of the casing, there being at least one adhesive element on said flange for attachment of the brake light casing to the inside surface of the vehicle rear window;

said bottom wall and said rear wall of the casing being so dimensioned that, with the casing flange attached to a vehicle rear window, the bottom and rear walls lie substantially horizontally and vertically, respectively, to ensure that light from the bulb is projected substantially horizontally to the rear of the vehicle, and said casing being of such a size as to surround the bulb and lens to a substantial extent whereby the passenger compartment of the road vehicle is shielded from the light of the bulb.

* * * * *